United States Patent [19]

Deplante et al.

[11] 4,110,672

[45] Aug. 29, 1978

[54] POSITION CODER USED WITH A MACHINE OF VARIABLE RELUCTANCE

[75] Inventors: Michel Deplante, Paris; Didier Minesi, Saint Fargeau-Ponthierry, both of France

[73] Assignee: Engins Matra, Paris, France

[21] Appl. No.: 675,623

[22] Filed: Apr. 9, 1976

[30] Foreign Application Priority Data

Apr. 14, 1975 [FR] France ................ 75 11585

[51] Int. Cl.² .............................. H02K 23/00
[52] U.S. Cl. .................... 318/254; 340/196
[58] Field of Search ........... 318/138, 254, 439, 196; 340/196; 324/34 PS, 34 D

[56] References Cited

U.S. PATENT DOCUMENTS

| | | | |
|---|---|---|---|
| 3,281,825 | 10/1966 | Corl et al. | 340/196 X |
| 3,501,664 | 3/1970 | Veillette | 318/254 |
| 3,597,670 | 8/1971 | Kohihagen | 318/138 |
| 3,628,145 | 12/1971 | Kihlberg | 324/34 D |
| 3,629,675 | 12/1971 | Porath | 318/138 |
| 3,683,248 | 8/1972 | Kobayashi et al. | 318/138 |
| 3,740,630 | 6/1973 | Jarret et al. | 318/138 |
| 3,801,833 | 4/1974 | Leitgeb | 318/254 |

*Primary Examiner*—Robert K. Schaefer
*Assistant Examiner*—Eugene S. Indyk
*Attorney, Agent, or Firm*—Mason, Kolehmainen, Rathburn & Wyss

[57] ABSTRACT

This invention is relative at a position coder used with a variable reluctance machine to control the commutations of the stator windings on this machine, said coder being characterized by having magnetic circuits for its rotor and its stator which are identical to those on the variable reluctance machine and which are set in an identical manner.

9 Claims, 3 Drawing Figures

POSITION CODER USED WITH A MACHINE OF VARIABLE RELUCTANCE

The invention deals with a position coder used with a machine of variable reluctance such as a variable reluctance motor.

A variable reluctance motor generally comprises a rotor made up of a stack of rings of magnetic sheet iron having on the periphery of the stack, teeth cut at constant pitch. A stator also made up of a stack of rings of magnetic sheet iron surrounds the rotor and is concentric with it, while an intermediate small air space is allowed between the rotor and the stator. On its inside face which is nearest the rotor, the stator has regularly spaced recesses set on a polar pitch; in these recesses the stator windings are located. On this same face closest to the rotor, the stator has, in addition, teeth similar to those on the rotor; the pitch of these teeth, within each stator winding, is identical to the pitch of the teeth on the rotor. Nevertheless, between one stator winding and the next, the stator teeth show a progressive shift relative to those on the rotor giving a "Vernier" effect.

The assembly corresponding to the part of the stator covering two successive stator windings and the part of the rotor which faces it constitutes a magnetic circuit whose reluctance varies with the angular position of the rotor relative to the stator. The sequential commutations of the stator windings should take place each time that the magnetic circuit corresponding to any two adjacent stator windings is in its state of maximum or minimum reluctance. This implies an exact synchronism between these sequential commutations in relation to the angular position of the rotor. In principle, because the rotor teeth are uniformly spaced out, any static incremental coder would be able to ensure this synchronism provided that the number of its steps were equal to the number of teeth on the rotor and that the coder were positioned so that its transitions corresponded to the limiting positions of reluctance.

In practice, particularly taking into account manufacturing tolerances in the variable reluctance motor causing, for example, errors in concentricity between rotor and stator, it is a very delicate operation to obtain this positioning with sufficient precision to ensure correct functioning of the variable reluctance motor.

The aim of the invention is to overcome this important difficulty in the production of variable reluctance motors and consequently to create a position coder built in to the machine allowing exact synchronising of the commutations of the stator windings whilst requiring no delicate adjustment and remaining indifferent within wide limits to manufacturing errors such as a lack of concentricity between rotor and stator.

To this end, the invention is concerned with a coder characterised by having magnetic circuits for rotor and stator which are identical to those of the variable reluctance machine and which are set in the same way.

The invention will now be described in more detail with reference to a production example shown in the attached drawings in which, FIG. 1 shows schematically, in section on a plane perpendicular to the axis of the motor, the arrangement of the magnetic circuits of the coder according to the invention;

Figure 1:
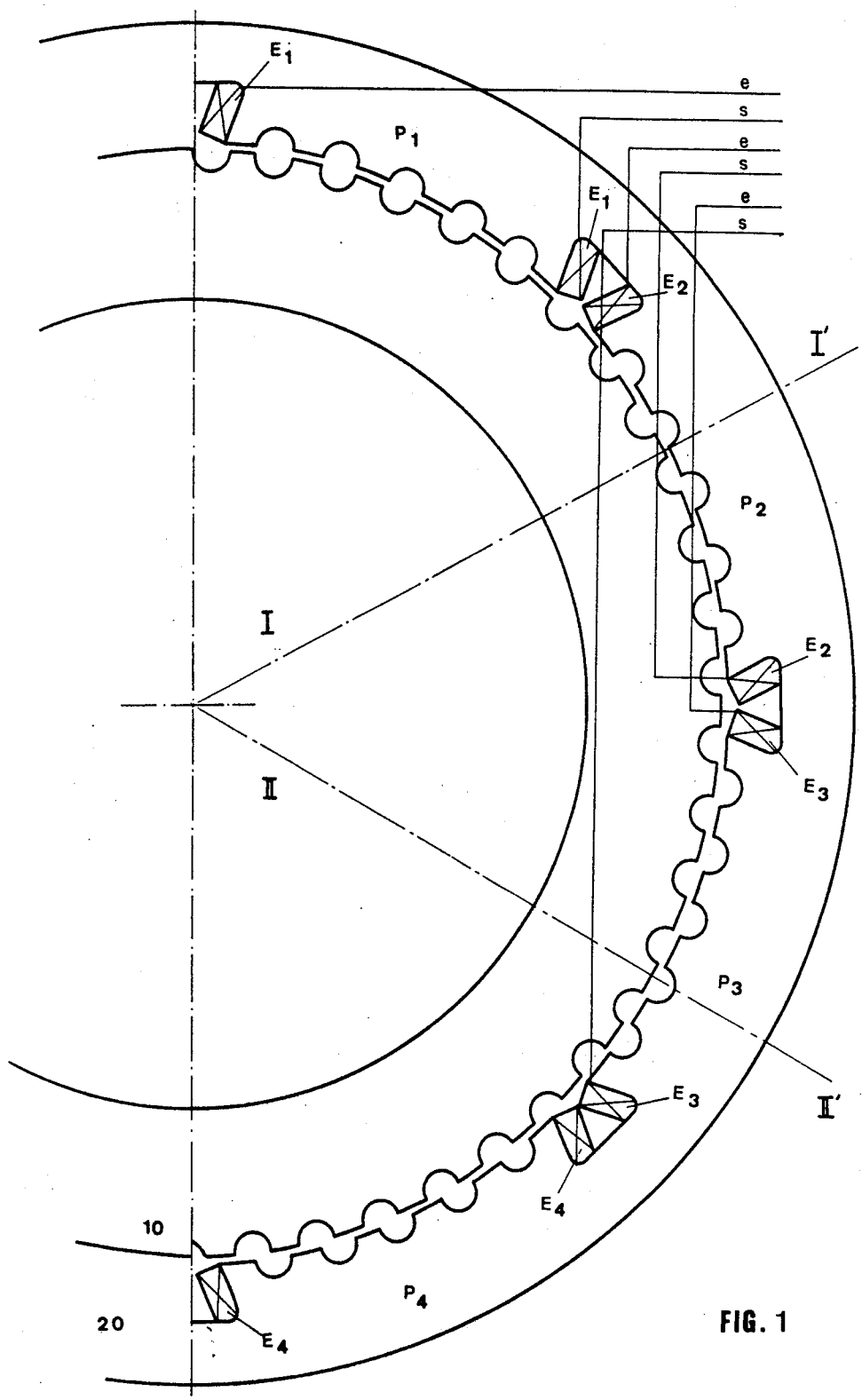
FIG. 1a shows one variant of the detector windings but in order to keep it simple, this figure has been limited to the sector defined by the lines I — I', II — II', on FIG. 1.
Figure 1:
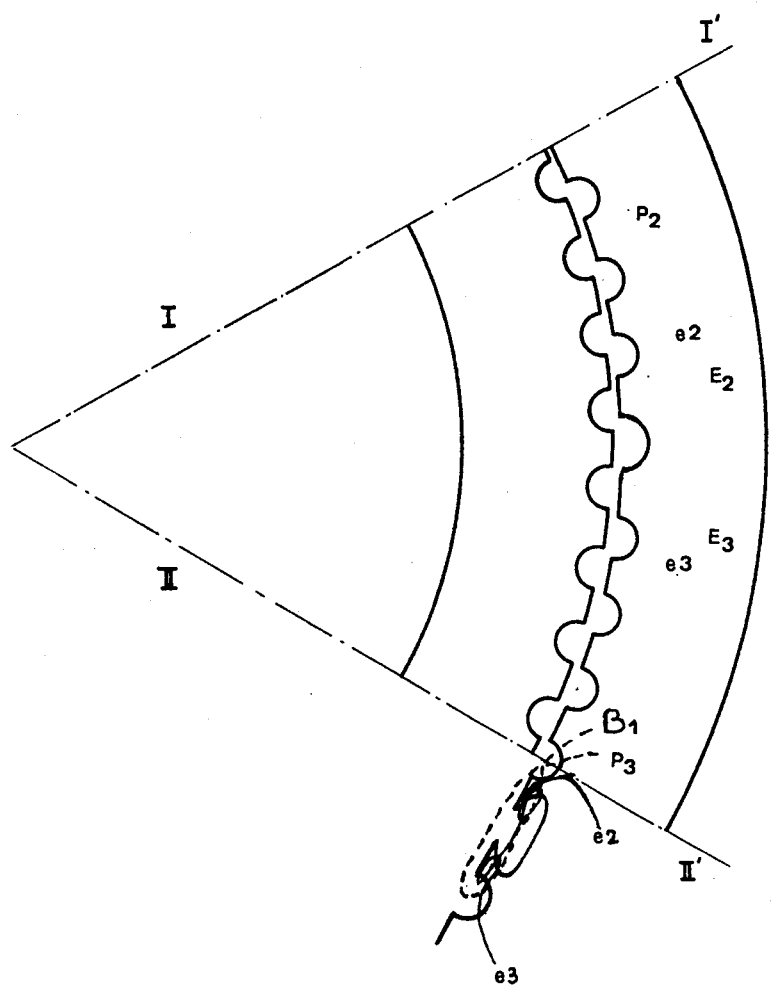

As shown in FIG. 1, the position coder consists of a rotor 10 and a stator 20. The rotor 10 is made up of a stack of rings of magnetic sheet iron identical to the magnetic sheet iron used for the rotor of the variable reluctance motor, and fixed in an identical manner on the shaft of this motor. Simply, the stack forming the rotor 10 of the position coder is magnetically insulated from the stack forming the rotor of the motor and it is thinner than this latter, its thickness can be for example, of the order of 5 mm.

The stator 20 is constituted by a stack of rings of magnetic sheet iron identical to the rings of magnetic sheet iron which make up the stator of the variable reluctance motor and positioned on this stator in such a way that its recesses and its teeth are aligned in a direction parallel to the axis of the motor with the recesses and the teeth of the stator of the motor. Simply, the stack making up the stator 20 of the position coder is magnetically insulated from the stack which makes up the motor stator and it is thinner than it, its thickness being the same as that of the rotor 10. The stator 20 of the coder thus has the same number of poles $P_1$, $P_2$, $P_3$, $P_4$, . . . as the stator of the motor itself and the same number of stator pole windings $E_1$, $E_2$, $E_3$, $E_4$, . . . , each of these windings having an entry $e$ and an exit $s$. The windings of the even row, for example, constitute the "detector coils" ($E_2$, $E_4$ . . . ) and the windings of the odd row therefore constitute the "exciter coils" ($E_1$, $E_3$, . . . ).

Figure 2:
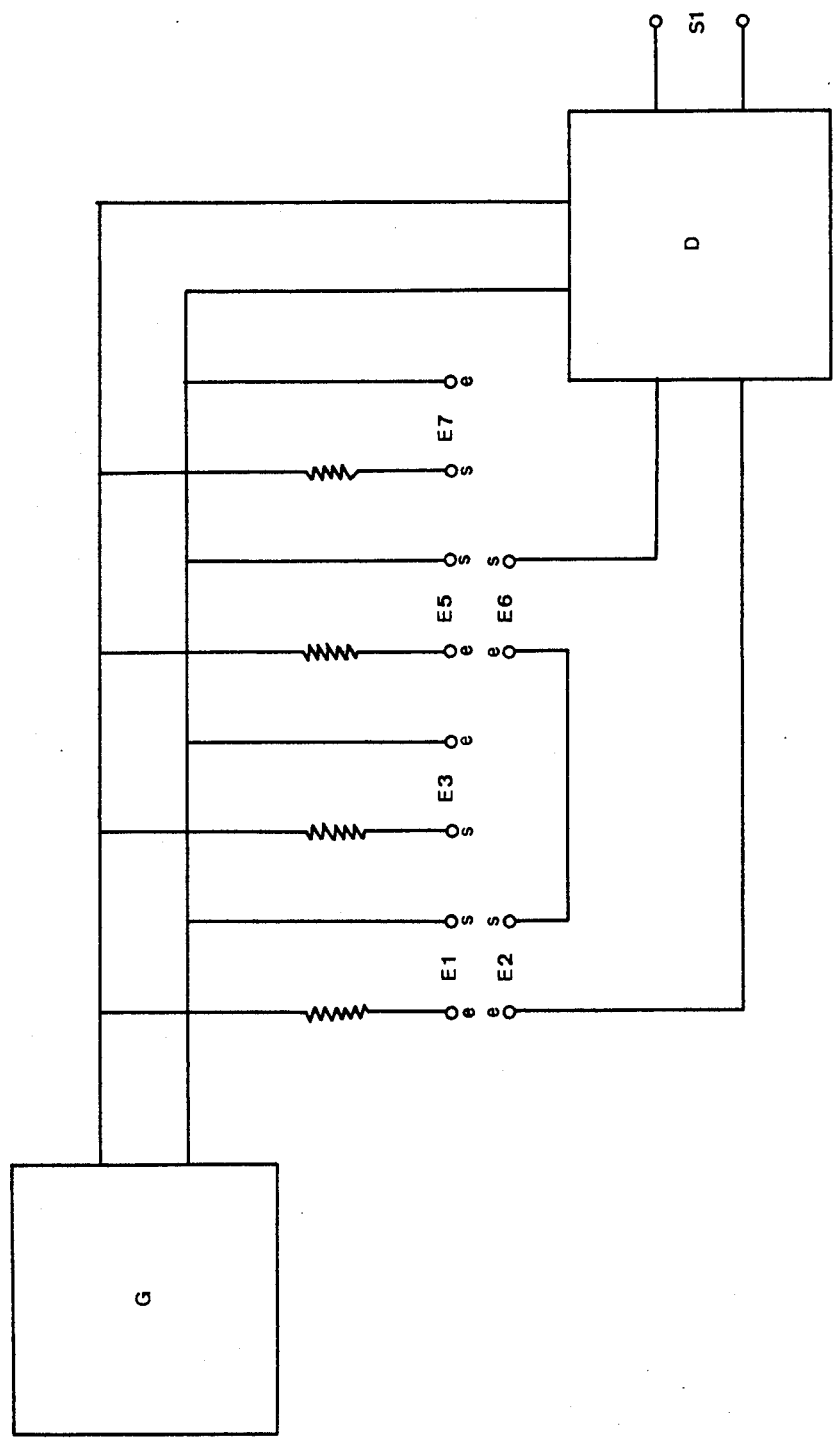
FIG. 2 is a block circuit diagram of the position coder according to the invention.

FIG. 2 is a block circuit diagram of the position coder according to the invention. A generator of sine wave current G feeds the exciter coils ($E_1$, $E_3$, . . . ) at a frequency $fo$ lying for example, between 10 and 100 KHz, and connection is made so that two successive exciter coils will cause a flux in opposite directions. The detector coils ($E_2$, $E_6$, . . . ) are connected in series. In this way there has been produced the equivalent of a differential transformer and the amplitude of the voltage received on the detector coils is cancelled out each time that the reluctance of the magnetic circuit is at its limits.

The detector coils connected in series are linked to a synchronous demodulator D which eliminates from the voltage picked up, the carrier frequency $fo$ and delivers an alternating signal $S_1$ which passes the zero point at positions corresponding to those of the limits of reluctance. This signal thus allows the commutations of the stator windings in the motor to be produced in exact synchronism with the positions of limiting reluctance. To ensure commutation in the correct conditions, it is, however, not sufficient merely to having a synchronising signal but also to know the direction of rotation of the motor. This information can be simply obtained by creating, in the following manner, two synchronising signals offset 90° whose direction of offset corresponds to the direction of rotation of the motor. With the help either of a second set of coils through which passes a current at a frequency $f1$, different from $fo$ or of a second magnetic circuit identical to the previous one and using the same frequency $fo$, it is possible to detect in the same way the positions of limiting reluctance, by permutation of the exciter coils with the detector coils in the previous case. For example, on the diagram of FIG. 2, if $E_1$ is replaced by $E_2$, $E_3$ by $E_4$, $E_5$ by $E_6$, $E_7$ by $E_8$ on the one hand, and $E_2$ by $E_3$, $E_6$ by $E_7$ on the other ($E_2 E_6$ correspond to coils wound on the same poles as $E_2$ and $E_6$, but without any point in common with them) there is obtained in place of $S_1$ a signal $S_2$, which for a constant speed of rotation of the rotor will be offset 90° from $S_1$.

FIG. 1a shows a variant of the detector coils with references $e_2$, $e_3$. By using detector coils of smaller size such as $e_2$, $e_3$ it is possible to work at higher frequencies and so to improve the sensitivity of detection and thus to increase the precision in determining the instant when the signal passes zero.

The sum of the voltages coming from the detector coils makes it possible to reduce to a negligible level the influence of variations in the intermediate air space caused by errors in concentricity between rotor and stator. Over and above this, the temperature, the presence of an EMF induced in the coils, the stability of the frequency and the amplitude of the carrier have no influence at all on the accuracy of the timing at which the detected voltages pass the zero point.

Thus, the position coder which has been described shows specific advantages for the control of a variable reluctance machine. These advantages derive essentially from the use in this coder of magnetic circuits identical with the magnetic circuits in the motor, set in an identical manner and, because of this, needing no adjustment.

Naturally, the invention is not limited to the practical example described and shown above; on this basis it is possible to have other variants, without these falling outside the limits of the invention.

We claim:

1. A shaft position coder comprising:
   a stator having disposed thereon first and second exciter coils and a detector coil magnetically coupled to said first and second exciter coils;
   means for applying an alternating current voltage to said first and second exciter coils electrically coupled to said exciter coils for causing said first exciter coil to induce a first polarity alternating current voltage in said detector coil and for causing said second exciter coil to induce a second opposite polarity alternating current voltage in said detector coil;
   a rotor disposed in proximity to said exciter and detector coils and operative to alter the magnetic coupling between each exciter coil and the detector coil in response to the angular position of said rotor with respect to said stator to vary the relative amplitudes of the first and second polarity voltages induced in said detector coil; and
   means electrically coupled to said detector coil and responsive to the voltages induced in said detector coil for determining the relative position of said rotor and said stator.

2. A shaft position coder as recited in claim 1 wherein said rotor and stator include cooperating means for increasing the magnetic coupling between said detector coil and one of said first and second exciter coils while simultaneously reducing the magnetic coupling between said detector coil and the other one of said exciter coils in response to a change in the angular position of said rotor with respect to said stator.

3. A shaft position coder as recited in claim 2 wherein said coils are circumferentially spaced along said rotor, and said cooperating means includes a first plurality of circumferentially spaced teeth disposed along the periphery of said rotor and a second plurality of opposed circumferentially spaced teeth disposed on said stator between said coils, changes in the relative positions of said first and second pluralities of teeth serving diffentially to alter the magnetic coupling between said exciter coils and said detector coils in response to changes in the angular position of said rotor with respect to said stator.

4. A shaft position coder as recited in claim 2 wherein said induced voltage responsive means includes null detecting means for providing an indication of the cancellation of said first and second induced alternating current voltages.

5. A shaft position coder as recited in claim 4 wherein said null detecting means includes a synchronous demodulator.

6. A shaft position coder as recited in claim 1 wherein said stator has a predetermined number of exciter coils and an equal number of detector coils disposed about the periphery thereof, each of said detector coils being interposed between two of said exciter coils, said two exciter coils being operative to induce opposite polarity alternating current voltages into the detector coils disposed therebetween.

7. A shaft position coder as recited in claim 6 wherein said alternating current voltage supplying means is electrically coupled to each of said exciter coils.

8. A shaft position coder as recited in claim 7 wherein said detector coils are connected in series.

9. A shaft position coder as recited in claim 6 wherein said coder is usuable with a variable reluctance machine having a predetermined number of stator windings, and wherein the number of exciter coils is equal to the number of stator windings of said variable reluctance machine.

* * * * *